No. 774,746.

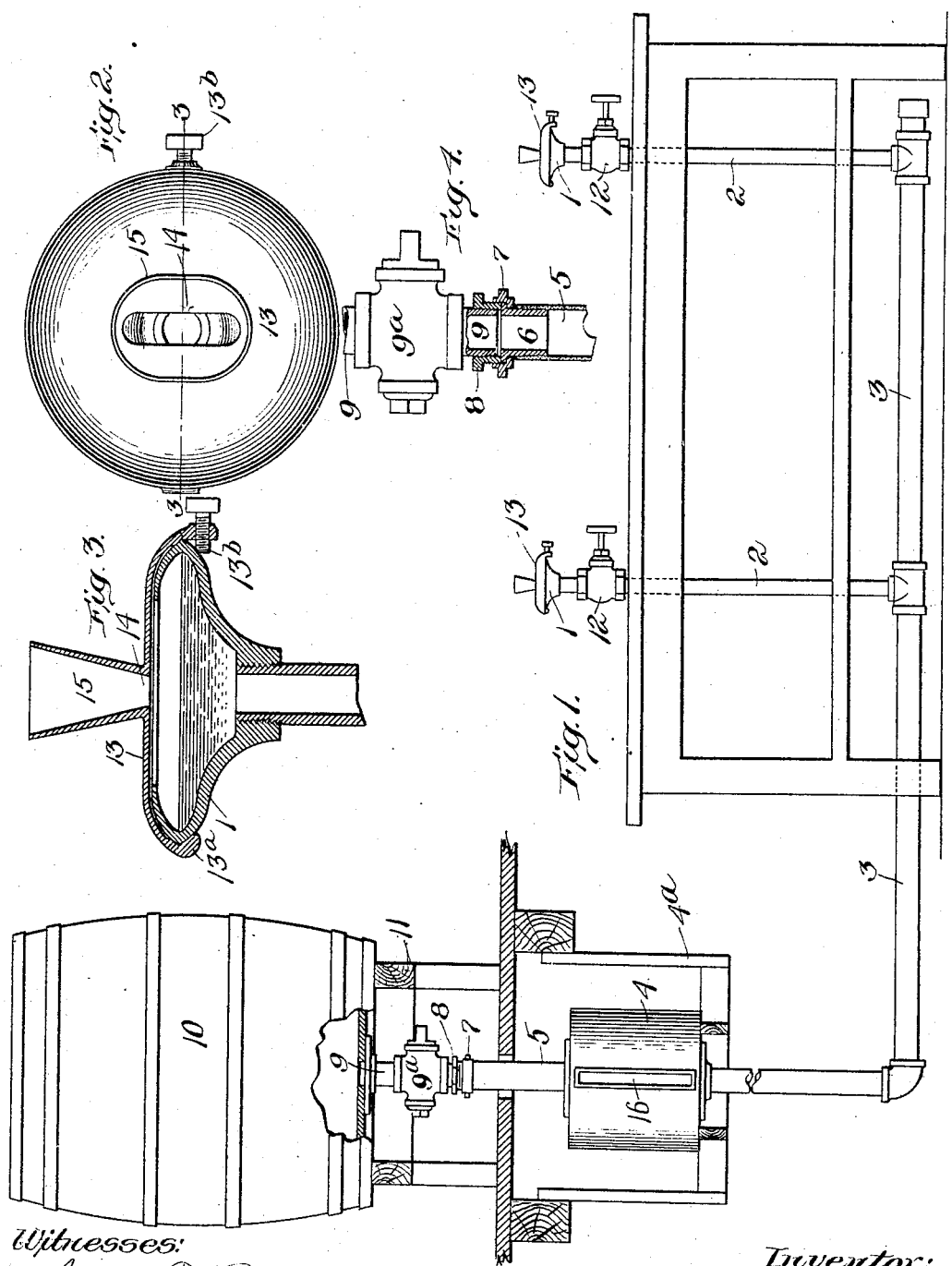

Patented November 15, 1904.

UNITED STATES PATENT OFFICE.

FRED L. EMERSON, OF BRIDGEWATER, MASSACHUSETTS.

APPARATUS FOR DISTRIBUTING LIQUIDS.

SPECIFICATION forming part of Letters Patent No. 774,746, dated November 15, 1904.

Application filed January 7, 1904. Serial No. 188,152. (No model.)

*To all whom it may concern:*

Be it known that I, FRED L. EMERSON, a citizen of the United States, and a resident of Bridgewater, in the county of Plymouth and State of Massachusetts, have invented new and useful Improvements in Apparatus for Distributing Liquids, of which the following is a specification.

My invention relates to distributing apparatus for liquids, and has for its object primarily to provide a distributing apparatus for liquids from which the latter can be readily removed as needed to be used and which will prevent loss by evaporation or careless handling.

In the manufacture of boots and shoes the use of liquid cement is required to fasten the innersole in place, to fasten canvas to the innersole, and in several other operations. The ingredients of the cement are held in suspension by naphtha, which, as is well known, is highly volatile, so that if unconfined it soon evaporates and is lost. The cement is supplied to the manufacturer in barrels, and in using the cement the practice has heretofore been to provide a vent in the top of the barrel and each morning to draw off into a smaller barrel or other holder enough cement to last through the day. In using the cement each operator has been provided with a small open and portable bench pan or dish from which to transfer the cement to the article on which it was to be used by means of a brush, and when the contents of his pan were exhausted it has been necessary for him to refill it from the smaller barrel or other daily-supply holder. This method has proven troublesome and unsatisfactory mainly because of the loss of naphtha from the cement while the latter was in the operator's bench-pan, but also on account of wastage and evaporation through careless handling. Another serious objection has been that the vent provided in the top of the main supply-barrel, the purpose of which was to permit the entrance of air to take the place of the cement as it was removed from the barrel, caused an explosive mixture of air and naphtha to collect within the barrel, which is dangerous and affects the cost of insurance on the building and stock. A further objection has been that in transferring the cement from the pan to the shoe-sole or other article the operator in order to work quickly invariably picked up more cement with his brush than was necessary to cover a sole rather than not enough, which would require a second trip of the brush to the pan. As a result more cement has heretofore been used than has been necessary, and the cost, therefore, was correspondingly great.

My invention also has for its object to provide an apparatus for distributing cement wherein the dangerous and wasteful characteristics of the means heretofore employed for the same purpose in the manufacture of shoes are obviated or reduced to a minimum.

My apparatus for distributing cement or the like comprises a basin or distributing vessel into which one end of a conduit discharges, the other end of said conduit being arranged above the basin and communicating with a preferably air-tight reservoir. In the conduit and near the basin is provided a normally closed valve by means of which the operator can permit a limited quantity of cement to discharge by gravity from the conduit into the basin, from which it may be transferred to the shoe-sole by the usual brush. By this construction only the cement in the basin is exposed to the air, and this can be readily replenished merely by operating a valve. Moreover, the main reservoir may be an ordinary barrel and the same one in which the cement was delivered from the cement-maker to the shoe-manufacturer, and as soon as it is emptied it can be detached from the conduit and another barrel of cement substituted.

In the best form of my invention I provide an intermediate reservoir in the conduit below the main reservoir, and this intermediate reservoir is preferably made so that its contents may be gaged, the object being that when the main reservoir is empty that fact will be indicated by the gage of the intermediate reservoir, and during the time the empty main reservoir is being removed and a filled main reservoir is being substituted therefor the contents of the supplemental reservoir will be sufficient to supply the demand on the apparatus.

Other features of my invention which are hereinafter pointed out relate chiefly to the construction of the basin, whereby it is not only made impossible for the operator to overload his brush with cement, but wastage through evaporation is practically eliminated, and to the construction of the connecting means between the main reservoir and the conduit, whereby the operation of removing an empty main reservoir and installing a filled one is facilitated.

In the accompanying drawings, Figure 1 is an elevation of an apparatus embodying one form of my invention. Fig. 2 is an enlarged plan view of one of the basins hereinafter described. Fig. 3 is a detail hereinafter described. Fig. 4 is a sectional view of the pipe connection between the main reservoir and the intermediate reservoir hereinafter described.

Having reference to the drawings, 1 1 represent basins or distributing vessels, each of which is fixed to and supported by the upper end of a distributing-pipe 2. At their lower ends the pipes 2 join a main supply-pipe 3, closed at one end and communicating at its other end with the bottom of an intermediate reservoir 4 of relatively small capacity supported above the basins 1 1 by a hanger $4^a$, which may be fixed to the ceiling of the room in which the cementing operations are performed. Communicating with the top of the intermediate reservoir 4 is a flexible section of pipe 5, herein shown as a piece of woven hose strapped at its upper end to a flanged metal sleeve 6, on which is swiveled an interiorly-screw-threaded coupling member 8, fast to a section of pipe 9, in which is a valve $9^a$. Jointed pipes may be substituted for the hose connection, if preferred. The pipe 9 at its upper end is screwed into the bottom of a main reservoir 10, herein shown as an ordinary barrel, such as is used to ship cement in, said barrel being supported by a table 11.

In each pipe 2 is a normally closed valve 12, by means of which the operator can permit a limited quantity of cement to flow by gravity into basin 2. Each basin is provided with a top 13, fastened in place by means of a lug $13^a$ and screw $13^b$, said top being also made with a slot 14, surmounted by a funnel 15. This slot, with its funnel, is an important feature of my invention, for while it permits the entrance into the basin of a brush or the like by which the cement is transferred to the sole or other article on which it is used, yet it is so proportioned that the operator cannot withdraw his brush from basin 1 overloaded with cement, but with only enough to cover the sole.

When the brush is drawn upwardly through the slot 14, the surplus cement is doffed therefrom by the edge of the slot, and by holding the brush in contact with one side of the funnel 15 as it is raised all drippings are caught and removed by said funnel and returned to the basin. The main purpose of top 13 is to support the funnel 15, and so far as this function is concerned its shape is immaterial; but herein I have shown said top as completely closing basin 1 except for slot 14, and this is highly desirable, because it covers the basin and retards the evaporation of the naphtha of the cement. From use of my apparatus I have found that when a quantity of cement is left in basin 1 over night a scum of hardened cement will form upon the top of the contents of the basin, due to evaporation of naphtha from that part of the contents, and this scum will seal the basin so as to prevent the evaporation of the naphtha below said scum, and this is due to the fact that the basin 1 being entirely closed except for slot 14 evaporation is so retarded that the top portion of the contents will harden before the naphtha of the lower portion can escape to any material degree. In resuming operations in the morning the operator admits a fresh supply of cement to the basin, which softens the scum or crust, and then penetrates the more or less softened top portion of the contents of the basin with his brush to reach the liquid portion below, and it is but a short while before the scum is dissolved and disappears. The slot-and-funnel construction is also valuable as a protection against accidental fires. A small quantity of mixed air and naphtha or like solvent collects under the top 13 and in the funnel 15. If this should become ignited from any cause, the resulting explosion is very slight, and the flame will either burn feebly at the top of the funnel or go out of itself for lack of fresh supply, the gaseous products of combustion in the funnel serving to stifle the flame. In shoe factories the operators are usually paid by the piece, and therefore in their efforts to turn out work quickly little or no care is used to economize in the amount of cement used. The use of the basin above described, however, prevents wastage due to overloading the brush, and, moreover, the evaporation of the naphtha of the cement in the basin is very greatly reduced.

The intermediate reservoir 4 is made with a glass panel 16, through which the contents of said reservoir may be observed. When the barrel 10 has been emptied, the level of the contents of intermediate reservoir 4 as seen through panel 16 will indicate that fact, and the operator then disengages coupling members 7 and 8 and removes barrel 10 from table 11 and with it pipe 9. Said pipe 9 is then detached from barrel 10 and attached to a fresh barrel, and after valve $9^a$ is closed said barrel is placed upon table 11 and coupling members 7 and 8 reconnected. The purpose of using a flexible pipe-section 5 is to make it unnecessary to center the barrel exactly when it is placed on table 11, and, as will be obvious, any other suitable flexible connection whereby this result will be secured may be employed in lieu of that herein shown.

An important feature of my invention is that the barrel 10 may be maintained airtight—that is, I have found that it is unnecessary with my apparatus to provide a vent in said barrel—and that the expansion of the volatile element of its liquid contents will fill up the space occupied by the removed liquid. Thus it will be observed that at no time is there an explosive body of mixed air and naphtha or the like in the barrel 10, nor is there any chance for the admission of an igniting-flame to any portion of the system which is capable of collecting inflammable gas. In fact, the only point at which the naphtha or the like is permitted to mix with the air or is exposed to chance of ignition is at the basin 1, and should from any cause combustion occur at one of these points it would be insignificant and short-lived because of the small capacity of each basin. Any one of the basins will if ignited merely burn like a torch and can be easily extinguished.

Another advantage of my invention is that the barrel in which the cement is shipped can serve as the main reservoir, and thereby all pouring and handling of the cement and loss due thereto is dispensed with and prevented.

What I claim is—

1. In an apparatus for distributing liquids whereof a constituent part is volatile; the combination of a closed reservoir; a conduit leading therefrom and delivery-pipes connected with the conduit having their terminals under liquid-head from the reservoir, the system being closed when in operative condition save for the terminal openings of the delivery-pipes.

2. In an apparatus for distributing liquids whereof a constituent part is volatile; the combination of a closed air-tight reservoir; a pipe leading from the reservoir; and a liquid-holding basin into which said pipe discharges, the entire system being closed save at the basin and the latter being under liquid-head from the reservoir so as to be supplied with liquid from the reservoir by the volatilization of the contents of the apparatus assisted by gravity.

3. In an apparatus for distributing liquids whereof a constituent part is volatile; the combination of a closed air-tight main reservoir; a closed air-tight intermediate reservoir; a pipe connection between the main and intermediate reservoirs; a main pipe leading from the intermediate reservoir, and delivery-pipes leading from the main pipe having their terminals under liquid-head from the intermediate reservoir, the entire system when in operative condition being closed save for the terminal openings of the delivery-pipes.

4. In an apparatus for distributing liquids whereof a constituent part is volatile; the combination of a reservoir; a main pipe; delivery-pipes connected with the main pipe and having their terminals under liquid-head from the reservoir; and means to prevent the entry of flame to any part of the system occupied by the gas produced by volatilization of the contained liquid.

5. In an apparatus for distributing liquids, the combination with a reservoir and conduit leading therefrom of a basin into which the conduit discharges, and a slotted top for said basin overhanging and closing the mouth of the latter save for the slot of said top, said top being made upon its upper side with a flaring funnel bordering and rising from the edge of the slot.

6. In an apparatus for distributing liquid cement or the like, in combination, a removable main reservoir; a conduit detachably connected at one end with said reservoir; an intermediate reservoir located in said conduit below the main reservoir, that part of the conduit above said intermediate reservoir comprising two pipe-sections detachably coupled together, one of said pipe-sections being flexible; a valve in the pipe-section connected with the main reservoir, and a valve in the conduit below the intermediate reservoir.

7. In an apparatus for distributing liquid cement or the like, in combination, a removable main reservoir; a conduit detachably connected at one end with said reservoir; an intermediate reservoir located in said conduit below the main reservoir, that part of said conduit above the intermediate reservoir comprising two pipe-sections detachably coupled together, one of said pipe-sections being flexible; a valve in the pipe-section connected with the main reservoir; a basin into which said conduit discharges, and a valve in said conduit between the basin and the intermediate reservoir.

8. In an apparatus for distributing liquid cement or the like, in combination, a removable main reservoir; a conduit detachably connected at one end with said reservoir, an intermediate reservoir located in said conduit below the main reservoir, that part of said conduit above the intermediate reservoir comprising two pipe-sections detachably coupled together, one of said pipe-sections being flexible; a valve in the pipe-section connected with the main reservoir; a basin fixed to and supported by said conduit and into which the latter discharges, and a valve in said conduit between the basin and the intermediate reservoir.

9. In an apparatus for distributing liquids, in combination, a removable main reservoir; a conduit connected at one end with said reservoir; an intermediate reservoir located in said conduit below the main reservoir, that part of the conduit above the intermediate reservoir comprising a flexible pipe-section, a basin into which the conduit discharges; a top for said basin made with a brush-opening bordered by a funnel and closing said basin except for said opening, and a valve in said conduit between the basin and the main reservoir.

Signed by me at Boston, Suffolk county, Massachusetts, this 28th day of December, 1903.

FRED L. EMERSON.

Witnesses:
ARTHUR F. RANDALL,
JOSEPH T. BRENNAN.